United States Patent
Bolio et al.

(10) Patent No.: US 8,234,042 B2
(45) Date of Patent: Jul. 31, 2012

(54) AUTHORITY LIMITS FOR A VEHICLE STEERING SYSTEM

(75) Inventors: Robert R. Bolio, Clarkston, MI (US); Christopher A. Kinser, Grand Blanc, MI (US); Ross Feller, Ann Arbor, MI (US); Matthew M. Karaba, Oxford, MI (US); Loren J. Majersik, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1170 days.

(21) Appl. No.: 12/042,426

(22) Filed: Mar. 5, 2008

(65) Prior Publication Data

US 2009/0228173 A1  Sep. 10, 2009

(51) Int. Cl.
*B62D 6/08* (2006.01)
(52) U.S. Cl. .......................................... 701/42; 180/402
(58) Field of Classification Search .................... 701/41, 701/42; 180/402
See application file for complete search history.

(56) References Cited

U.S. PATENT DOCUMENTS

| 5,729,107 A * | 3/1998 | Shimizu et al. ............... 318/489 |
| 6,449,542 B1 * | 9/2002 | Bottiger et al. ................. 701/41 |
| 7,441,627 B2 * | 10/2008 | Ohta et al. ..................... 180/446 |
| 7,756,620 B2 * | 7/2010 | Bedner et al. ................... 701/41 |
| 2009/0118905 A1 * | 5/2009 | Takenaka et al. ............... 701/41 |
| 2009/0319114 A1 * | 12/2009 | Takenaka et al. ............... 701/29 |

* cited by examiner

*Primary Examiner* — Kevin Hurley
(74) *Attorney, Agent, or Firm* — Quinn Law Group, PLLC

(57) ABSTRACT

A method for controlling a limited by-wire active front steering system includes measuring an input steering angle, determining a tire saturation limit, and comparing the saturation limit to the input angle. A target actuator angle from a steering actuator is limited when the input angle is greater than the saturation limit. A constant value provides a fixed steering gear ratio when the input angle is less than the saturation limit. A limited by-wire steering system for a vehicle includes a steering device, a sensor for measuring an input steering angle, a controller for calculating a first target actuator angle when the input angle is less than a threshold, and a second target actuator angle when the input angle is greater than the threshold. The threshold is a calibrated saturation limit of a road wheel of the vehicle.

7 Claims, 2 Drawing Sheets

AUTHORITY LIMITS FOR A VEHICLE STEERING SYSTEM

TECHNICAL FIELD

This invention relates to a method and apparatus for controlling a vehicle steering system that is operable by-wire, and in particular to a method and apparatus for selectively applying steering angle authority limits to a limited by-wire active front steering system.

BACKGROUND OF THE INVENTION

Steering system connections in a conventional automotive vehicle are typically provided via direct mechanical linkages between a steering device and the front wheels of the vehicle. For example, in a rack and pinion steering system the rotation of a steering wheel rotates a pinion gear that is engaged with mating notches or teeth in a rack portion of the steering system. Tie rods connect the rack portion to the wheels, so that any rotational motion of the steering wheel ultimately rotates the road wheels to a resultant steering angle, which may vary depending on the steering ratio provided by the steering system. Other steering linkage designs may be used instead of a rack and pinion design, such as worm gears used in a re-circulating ball steering system. In either example, however, all control linkages are purely mechanical in nature.

By way of contrast, in a by-wire steering system, an electronically controlled steering actuator is positioned on or in proximity to the front drive axle, and one or more transducers and/or other sensors measure or detect the steering request or input to a steering device, which is usually a circular steering wheel. The sensors can be configured to measure a steering angle at the steering wheel, and/or as torque sensors for measuring a rotational force or torque applied to the steering wheel. The electronic input signals representing these measured or detected values are then transmitted electrically to a steering actuator, which executes a steering maneuver in response to the electronic input signals.

By-wire or electronic steering systems may be configured as a full by-wire system, in which a driver is completely decoupled from the road wheels and all steering input signals are electrically transmitted to the steering actuator. Alternately, a by-wire steering system can be configured as a limited by-wire system, in which a conventional mechanical steering linkage is retained, and in which an electronic steering signal is selectively used to augment or modify a steering response in the steering system.

Limited by-wire systems in particular can be configured to selectively vary a gear ratio to a degree that is determined in part by the speed of the vehicle, in order to optimize the steering response. For example, when driving in a parking lot under low speeds, a steering controller may decrease a steering ratio to allow for a tighter or more effortless steering maneuver. The same steering system may then increase a steering ratio when the vehicle operates at highway speeds to produce a desired steering response. However, conventional gear ratio variation methods may be less than optimal under certain dynamic conditions.

SUMMARY OF THE INVENTION

Accordingly, a control method is provided for use with a limited by-wire active front steering system, hereinafter referred to as an active front steering (AFS) system. Within the scope of the invention, the term AFS system refers to any limited by-wire system using an electromechanical device configured as a steering actuator in order to selectively add or subtract steering angle to or from a driver steering input signal as needed. Using the method of the invention, the functional authority of an AFS system to add or subtract steering angle is limited beyond a predetermined operating threshold, such as a calibrated adhesion or saturation limit of the road wheels of a vehicle. The method can be used during variable steering/ gear ratio (VGR) operating modes, wherein a number of steering wheel turns required for executing a particular steering maneuver is selectively modified based upon vehicle speed in order to facilitate the steering maneuver.

In particular, the method includes measuring an input steering angle imparted to a steering device of the vehicle, such as a steering wheel, determining an angular adhesion or saturation limit of the road wheels of the vehicle, and comparing the saturation limit to the input steering angle. A target actuator angle is then limited to a constant value whenever the input steering input angle is determined to be greater than the angular saturation limit.

Determining the angular saturation limit can include accessing a lookup table containing various calibration values for the angular saturation limit at different vehicle speeds, and therefore such a lookup table is indexed by vehicle speed. A fixed steering gear ratio, such as approximately 14:1 to 16:1 in one embodiment, is provided or effectively enabled by the constant value whenever such authority limits are applied.

A method is also provided for controlling a by-wire steering system having a steering actuator configured for applying a variable target actuator angle to modify a final steering angle delivered to a pair of road wheels of a vehicle. According to the method, a steering input angle is measured at a steering wheel of the vehicle, and an angular saturation limit of a road wheel of the vehicle is determined using the speed of the vehicle. The method includes comparing the input steering angle to the angular saturation limit, and commanding different target actuator angles from the steering actuator depending on whether the input steering angle is less than the angular saturation limit.

A limited by-wire steering system is also provided for use with a vehicle, including a steering device, at least one sensor for measuring an input steering angle imparted to the steering device, and a controller. The controller calculates a first target actuator angle when the input steering angle is less than a threshold, and a second target actuator angle when the input steering angle is greater than the threshold, the threshold being a calibrated saturation limit of a road wheel of the vehicle. The system includes a steering actuator for applying the target actuator angle to a pair of road wheels of the vehicle, with the sum of the input steering angle and the target actuator angle equaling a final steering angle imparted to the vehicle wheels.

The above objects, features, and advantages, and other objects, features, and advantages, of the present invention are readily apparent from the following detailed description of the best mode for carrying out the invention when taken in connection with the accompanying drawings.

DETAILED DESCRIPTION OF THE PREFERRED EMBODIMENT

Figure 1:
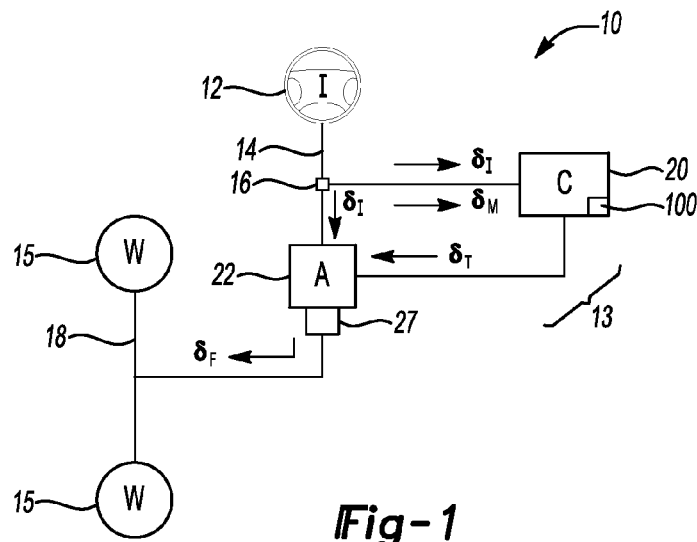
FIG. 1 is a schematic illustration of a vehicle having an active front steering (AFS) system and control method or algorithm according to the invention.

Referring to the drawings, wherein like reference numbers correspond to like or similar components throughout the several figures, and beginning with FIG. 1, a vehicle 10 includes a drive axle 18 having a pair of front road wheels 15 that are selectively steerable using a limited by-wire active front steering system 13, as that term is described previously hereinabove. The steering system 13 includes an integrated control unit or controller 20 that is configured, programmed, or otherwise provided with access to a steering control method or algorithm 100. The term "controller" as used herein is not intended to be limited to a dedicated steering controller, and the algorithm 100 is not necessarily resident within such a controller. For example, the algorithm 100 can also reside offline, where it is used to compute required values which can be stored in a lookup table (not shown) that are accessible by the controller, as will be described below with reference to FIG. 2.

The steering system 13 includes a steering column 14 that mechanically couples or links a steering device 12 with the road wheels 15, with the steering device 12 being configured as a steering wheel or any other driver-operable device suitable for steering the vehicle 10. The linkage between the steering device 12 and the road wheels 15 includes a variable gear reduction (VGR) mechanism 27, for example a rack-and-pinion system or any other steering system configured for providing variable gear reduction capabilities. For example, the VGR mechanism 27 provides a mechanical gear ratio, which the steering system 13 can modify as needed under changing vehicle speeds and other dynamic operating conditions, as will be described below.

The steering system 13 further includes one or more sensors 16 positioned on or in proximity to the steering column 14 and/or the steering device 12. The sensor or sensors 16 are also positioned on or in proximity to a steering actuator 22, also abbreviated A in FIG. 1, as described below. The sensors 16 are configured for detecting, measuring, or otherwise determining a driver-commanded or input steering angle corresponding to the angular position of the steering device 12, and represented in FIG. 1 as $\delta_I$, as well as for transmitting the input steering angle ($\delta_I$) to the controller 20 for use by the algorithm 100. With respect to the steering actuator 22, the sensor or sensors 16 are configured for detecting, measuring, or otherwise determining a measured actuator angle, $\delta_M$, a value used by the controller 20 as set forth below.

As indicated above, the steering system 13 includes the steering actuator 22, which is continuously connected to the road wheels 15, and which is configured for imparting or overlaying a target actuator angle ($\delta_T$) as calculated or determined by the controller 20 in order to produce a final steering angle ($\delta_F$) at the road wheels 15. The actuator 22 can be configured, for example, as a geared brushless DC electric motor, a harmonic motor, or any other device suitable for modifying the input steering angle ($\delta_I$) imparted to the steering device 12 by applying the target actuator angle ($\delta_T$).

As explained above, the target actuator angle ($\delta_T$) corresponds to a positive or negative desired correction angle to be applied to the input steering angle ($\delta_I$). The final steering angle ($\delta_F$) is the sum of the input steering angle ($\delta_I$) and the measured actuator angle ($\delta_M$), with the measured actuator angle ($\delta_M$) being the actual value of the calculated target actuator angle ($\delta_T$). That is, the target angle ($\delta_T$) is the desired adjustment angle to the steering input angle ($\delta_I$), and is used as input to the controller 20. The controller 20 calculates the necessary torque to apply to the actuator 22 to achieve the target angle ($\delta_T$). The measured actuator angle ($\delta_M$) is a measurement of the actual actuator angle or correction applied by the actuator 22, which can vary slightly from the target angle ($\delta_T$) based on various factors, such as the load on the actuator 22, temperature, etc. Therefore, it is desirable to use the measured actuator angle ($\delta_M$) in determining the final steering angle ($\delta_F$) imparted to the road wheels 15. If the algorithm 100 resides offline, it is also possible to approximate the measured actuator angle ($\delta_M$) as equal to the target actuator angle ($\delta_T$) for the purpose of determining the final steering angle ($\delta_F$).

The target actuator angle ($\delta_T$) can be determined by applying a predetermined gain function, such by applying a gain factor (K) to the input steering angle ($\delta_I$) imparted by the steering device 12. The gain factor (K) can be a function of vehicle speed and steering input angle ($\delta_I$), or another suitable function. Therefore, the target actuator angle ($\delta_T$) is represented in equation form as $\delta_T = K^* \delta_I$, with the gain factor K being a calibrated value that can be stored within the controller 20, such as in a lookup table or other data structure. As discussed briefly previously hereinabove, if the algorithm 100 is resident outside of the controller 20, the algorithm 100 can compute the gain factor (K) and store values for the gain factors (K) in a calibration table that is accessible by the controller 20. For example, the controller 20 could access the calibration table to select values for calculating the target actuator angle ($\delta_T$) using the input steering angle ($\delta_I$).

The algorithm 100 thus adds or subtracts the target actuator angle ($\delta_T$) in open loop from the input steering angle ($\delta_I$) in order to produce the final steering angle ($\delta_F$). In accordance with the invention, the algorithm 100 utilizes dynamic variables such as vehicle speed and the presence or absence of a predetermined operating condition of the vehicle 10 to determine when and/or whether to modify or adjust the input steering angle ($\delta_I$).

Figure 2:
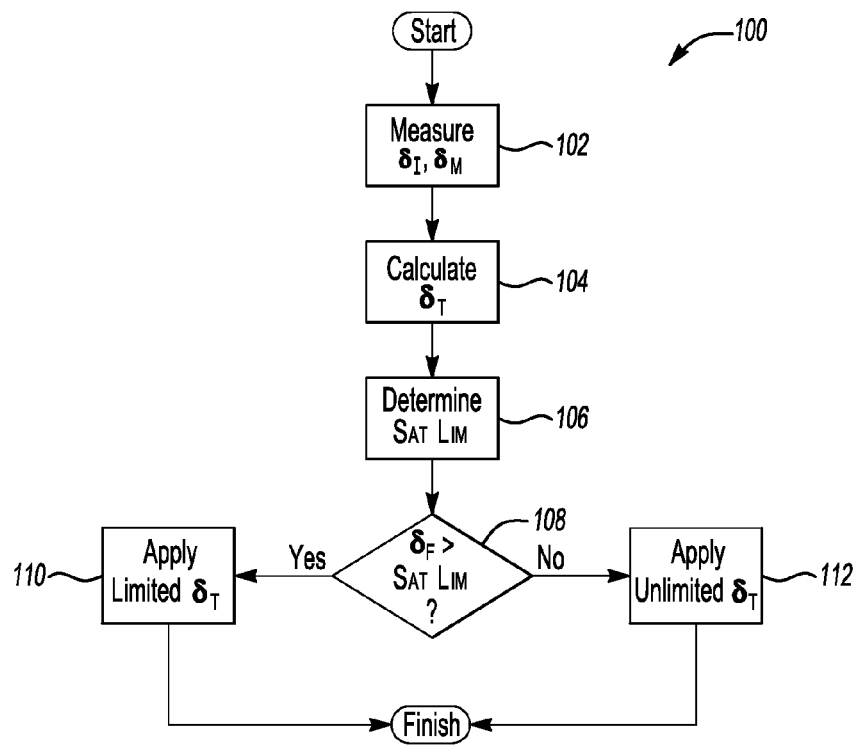
FIG. 2 is a flow chart describing the steering control method or algorithm shown in FIG. 1.

Referring to FIG. 2 with reference to the components of the vehicle 10 shown in FIG. 1, the algorithm 100 begins with step 102, in which the sensors 16 (see FIG. 1) measure, detect, calculate, and/or otherwise determine the value of the input steering angle ($\delta_I$) that is imparted to the steering device 12. Once this value has been determined, and stored temporarily in active memory such as a buffer (not shown) within the controller 20, the algorithm 100 proceeds to step 104.

At step 104, the algorithm 100 uses the input steering angle ($\delta_I$) and the speed of the vehicle 10 to calculate a target actuator angle ($\delta_T$) as described above. The speed of the vehicle can be measured directly at the road wheels 15 and/or by measuring or detecting a rotational speed of a transmission output member (not shown), or via a signal from a speedometer. Once the target actuator angle ($\delta_T$) is calculated, the algorithm 100 proceeds to step 106.

At step 106, the algorithm 100 determines a predetermined vehicle operating condition, which in the embodiment of FIG. 2 is an adhesion or saturation limit of the road wheels 15, this threshold value being represented in FIG. 2 as "Sat Lim". As will be understood by those of ordinary skill in the art, the term "saturation limit" refers to a calibrated value representing the maximum effective steering angle of the road wheels 15 at a given vehicle speed. The saturation limit corresponds to a point at which an incremental increase in input steering angle ($\delta_I$) produces a negligible increase in cornering force, as that term will be understood by those of ordinary skill in the art. This calibrated value is based on the adhesion limit of the road wheels 15, or more precisely to the limit of the ability of the tires (not shown) mounted to the road wheels 15, to continue to adhere to the road surface at a given vehicle speed and steering angle. This value can be stored within the controller 20 as, for example, a lookup table indexed by vehicle speed. Once the saturation limit has been determined, the algorithm 100 proceeds to step 108.

The algorithm 100 can determine a threshold or maximum permissible road wheel angle at the limit of adhesion, i.e., the saturation limit, based on a linear dynamic model for a desired range of speeds of the vehicle 10. The saturation limit can then be converted to a pinion angle based on the characterization of the mechanical steering gear (not shown) obtained from a steer ratio test. This pinion angle can then be transformed to a final steering angle ($\delta_F$) after multiplication by a suitable limiting factor, K_lim, and after consideration of the variable gear ratio calibration in the linear range. The factor K_lim, which in one embodiment is approximately 2 to 2.5, is included to avoid modifying the steering characteristics of the vehicle 10 (see FIG. 1) in the non-linear range typical of performance driving conditions.

At step 108, the algorithm 100 determines if the final steering angle ($\delta_F$) exceeds the saturation limit (Sat Lim), or alternately if the final steering angle ($\delta_F$) falls within a threshold band or range of the saturation limit (Sat Lim). If the final steering angle ($\delta_F$) exceeds the saturation limit (Sat Lim) or falls within the threshold band, the algorithm 100 proceeds to step 110, and otherwise proceeds to step 112.

At step 110, having determined at step 108 that the final steering angle ($\delta_F$) exceeds the saturation limit (Sat Lim), the algorithm 100 limits the target actuator angle ($\delta_T$) by limiting the authority of the controller 20 to continue to vary the target actuator angle ($\delta_T$) in conjunction with the input steering angle ($\delta_I$). In other words, the algorithm 100 applies a constant value for the target actuator angle ($\delta_T$), and holds this value until the conditions determined at step 108 indicate that the final steering angle ($\delta_F$) no longer exceeds the saturation limit. The result of this step is a fixed steering gear ratio, which in one exemplary embodiment is limited to approximately 75 to 85 percent of a maximum steering ratio. In another exemplary embodiment, in a steering system having a maximum available steering ratio of 18:1, the fixed steering gear ratio is approximately 14:1 to 16:1. However, such ranges are intended to be exemplary, and those of ordinary skill in the art will recognize that other ranges are usable within the scope of the invention.

At step 112, having determined at step 108 that the input steering angle ($\delta_I$) does not exceed the saturation limit, the algorithm 100 applies an unlimited target actuator angle ($\delta_T$), i.e., a target actuator angle that continues to vary in accordance with any variation in the input steering angle ($\delta_I$). A final steering angle is then delivered to the road wheels 15 without any functional authority limits being applied to the target actuator angle ($\delta_T$) by the proposed method or algorithm 100. Each of these results will now be explained with reference to FIG. 3.

Figure 3:
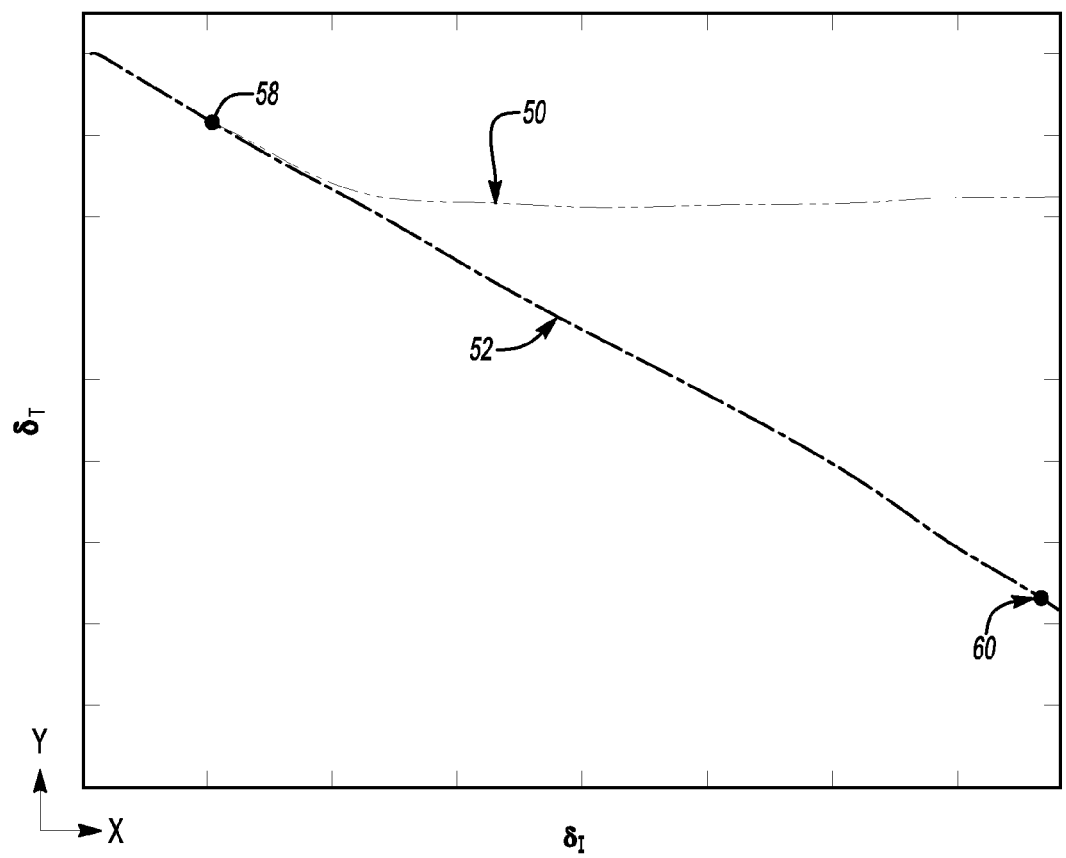
FIG. 3 is a graph plotting a final steering angle against a driver input angle under two operating conditions.

Referring to FIG. 3, the results of steps 110 and 112 described above with reference to FIG. 2 are represented in graph form. Input steering angle ($\delta_I$) is plotted along the x-axis, and target actuator angle ($\delta_T$) is plotted along the y-axis. As represented by line 52, without the application of functional authority limits provided by the algorithm 100 (see FIGS. 1 and 2), the target actuator angle ($\delta_T$) will continue to vary in conjunction with any changes in the input steering angle ($\delta_I$), until a maximum available target actuator angle is reached at point 60.

However, when the algorithm 100 determines at step 108 (see FIG. 2) that the input steering angle ($\delta_I$) exceeds a threshold, such as the saturation limit of the road wheels 15 (see FIG. 1) discussed above and represented in FIG. 3 by point 58, the algorithm 100 functionally limits the target actuator angle ($\delta_T$) that may be applied. Any final steering angle will then be determined solely by the input steering angle ($\delta_I$) and a constant target actuator value, which is represented in FIG. 3 by line 50.

While the best modes for carrying out the invention have been described in detail, those familiar with the art to which this invention relates will recognize various alternative designs and embodiments for practicing the scope of the invention within the scope of the appended claims.

The invention claimed is:

1. A method for controlling a by-wire steering system having a steering device that is actuated by a steering actuator, a steering angle sensor, and a controller in communication with the steering actuator and the steering angle sensor, wherein the controller is configured for commanding a target actuator angle from the steering actuator to thereby modify a final steering angle of a pair of road wheels of a vehicle, the method comprising:
    measuring an input steering angle to the steering device using the sensor;
    measuring a speed of the vehicle;
    determining an angular saturation limit of the pair of road wheels;
    comparing the measured input steering angle from the sensor to the angular saturation limit;
    commanding, via the controller, a first target actuator angle from the steering actuator when the input steering angle is less than the angular saturation limit; and
    commanding, via the controller, a second target actuator angle from the steering actuator when the input steering angle is greater than the angular saturation limit.

2. The method of claim 1, further comprising:
    calculating the first target actuator angle as a gain function of the input steering angle and the speed of the vehicle.

3. The method of claim 1, wherein determining an angular saturation limit includes selecting a calibrated value from a lookup table.

4. The method of claim 1, wherein commanding a second target actuator angle includes limiting the value of the target actuator angle to provide a predetermined fixed steering gear ratio.

5. The method of claim 4, wherein the predetermined fixed steering gear ratio is approximately 75 to 85 percent of a maximum steering ratio of the AFS system.

6. The method of claim 1, wherein commanding the second target actuator angle includes defaulting to a constant value providing a predetermined fixed steering gear ratio, and applying the constant value until the measured input steering angle is less than the angular saturation limit.

7. The method of claim 6, wherein the fixed steering gear ratio is approximately 14:1 to 16:1.

* * * * *